United States Patent
Christensen

(10) Patent No.: US 7,610,120 B2
(45) Date of Patent: Oct. 27, 2009

(54) METHOD AND SYSTEM FOR TRACKING VEHICLE SERVICES

(75) Inventor: Paul M. Christensen, Fraser, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 838 days.

(21) Appl. No.: 11/223,712

(22) Filed: Sep. 9, 2005

(65) Prior Publication Data

US 2007/0061069 A1    Mar. 15, 2007

(51) Int. Cl.
*G06F 17/30* (2006.01)
*G06F 17/40* (2006.01)

(52) U.S. Cl. .................. 701/1; 705/1; 701/32
(58) Field of Classification Search ............. None
See application file for complete search history.

(56) References Cited

U.S. PATENT DOCUMENTS

| | | | |
|---|---|---|---|
| 7,035,631 B2 * | 4/2006 | Schwinke et al. | 455/420 |
| 7,092,799 B2 * | 8/2006 | Oesterling et al. | 701/1 |
| 2004/0023647 A1 * | 2/2004 | Mazzara et al. | 455/419 |
| 2004/0203634 A1 * | 10/2004 | Wang et al. | 455/414.1 |
| 2005/0107132 A1 * | 5/2005 | Kamdar et al. | 455/569.2 |

FOREIGN PATENT DOCUMENTS

WO    WO 2004/056148    *    7/2004

* cited by examiner

*Primary Examiner*—Michael J. Zanelli

(57) ABSTRACT

A method of tracking vehicle services includes receiving a telematics unit unique identifier and associating a vehicle unique identifier with the telematics unit unique identifier. The method further includes associating a user with at least one unique identifier of a telematics unit and a unique identifier of a vehicle, associating an account with at least one user identifier; and tracking at least one vehicle service to a user based on the associated telematics unit, vehicle, user identifier, and account.

12 Claims, 3 Drawing Sheets

METHOD AND SYSTEM FOR TRACKING VEHICLE SERVICES

FIELD OF THE INVENTION

The present invention generally relates to tracking vehicle services.

BACKGROUND OF THE INVENTION

Many consumers desire to receive vehicle services in their vehicles with a wireless communications network. Telematics units provide service operators the ability to provide such services, often on a fee-based system.

However, tracking system usage and ensuring that the correct services are provided to the correct consumers creates a large and unwieldy amount of information. These difficulties are exacerbated by the relatively short time span of some consumers' ownership of a vehicle. The ability to monitor and retrieve this information is desirable.

The present invention overcomes these disadvantages and advances the state of the art.

SUMMARY OF THE INVENTION

One aspect of the present invention provides a method of tracking vehicle services including receiving a telematics unit unique identifier and associating a vehicle unique identifier with the telematics unit unique identifier. The method further includes associating a user with at least one unique identifier of a telematics unit and a unique identifier of a vehicle, associating an account with at least one user, and tracking at least one vehicle service to a user based on the associated telematics unit, vehicle, user, and account.

One aspect of the present invention provides a computer usable medium including computer readable code for tracking vehicle services including computer readable code for receiving a telematics unit unique identifier and computer readable code for associating a vehicle unique identifier with the telematics unit unique identifier. The medium further includes computer readable code for associating a user with at least one unique identifier of a telematics unit and a unique identifier of a vehicle, computer readable code for associating an account with at least one user, and computer readable code for tracking at least one vehicle service to a user based on the associated telematics unit, vehicle, user, and account.

Another aspect of the present invention provides a system for tracking vehicle services including means for receiving a telematics unit unique identifier and means for associating a vehicle unique identifier with the telematics unit unique identifier. The system further includes means for associating a user with at least one unique identifier of a telematics unit and a unique identifier of a vehicle, means for associating an account with at least one user, and means for tracking at least one vehicle service to a user based on the associated telematics unit, vehicle, user, and account.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

DETAILED DESCRIPTION OF THE PREFERRED EMBODIMENTS

Figure 1:
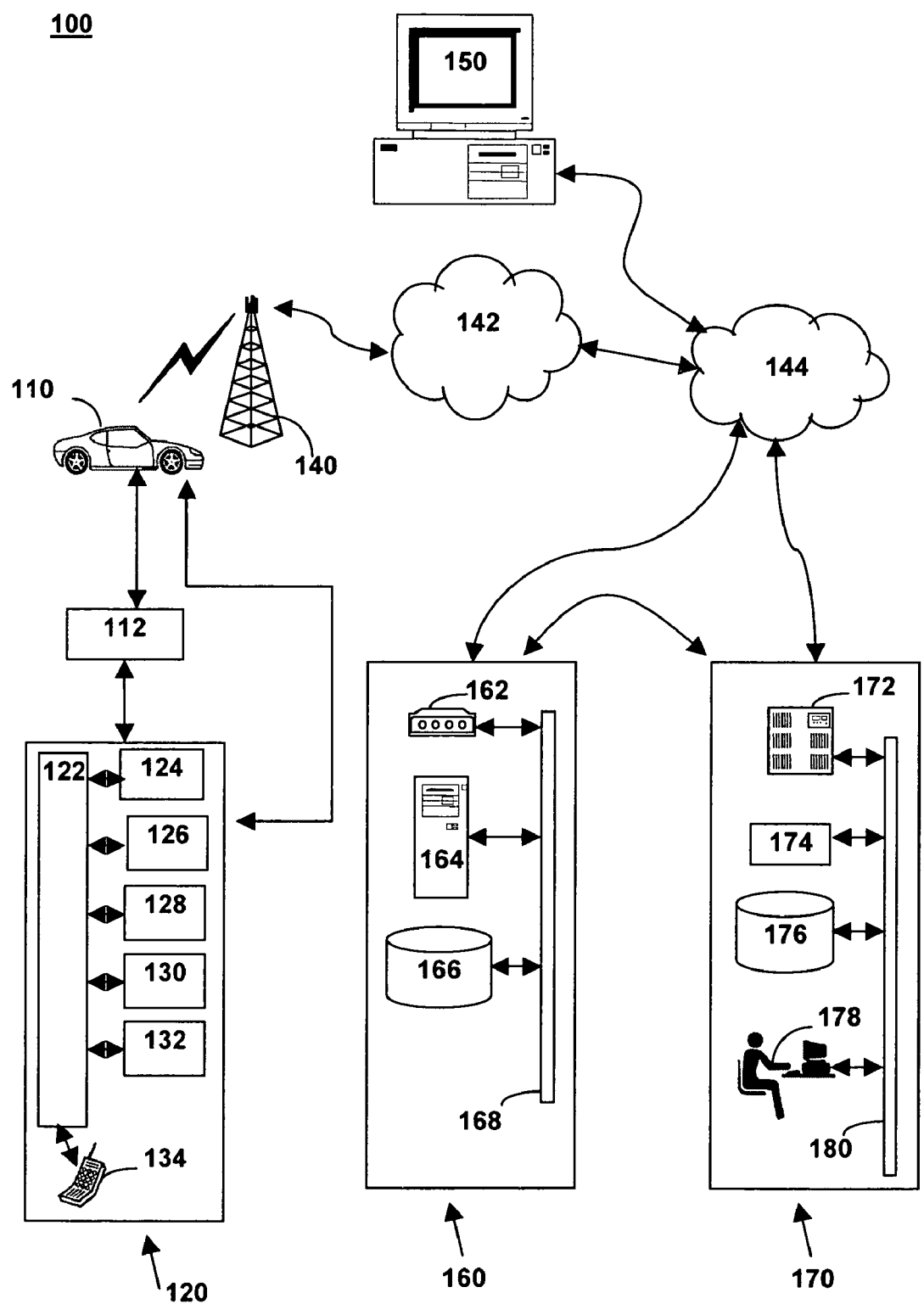
FIG. 1 illustrates an operating environment for a method for tracking vehicle services.

FIG. 1 illustrates an operating environment for a mobile vehicle communication system ("MVCS") 100 for providing vehicle services. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, telematics unit 120 is configured to receive a user identification signal and retrieve an indexed telecommunication profile associated with the received user identification signal. Telematics unit 120 may retrieve the indexed telecommunication profile from any memory device in communication with telematics unit 120. In one embodiment, the memory device is located within telematics unit 120, or within MVCU 110. In another embodiment, the memory device is located at call center 170 (described in further detail below) or in a location outside MVCU 110.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. In one embodiment, communication services manager 174 includes at least one digital and/or analog modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
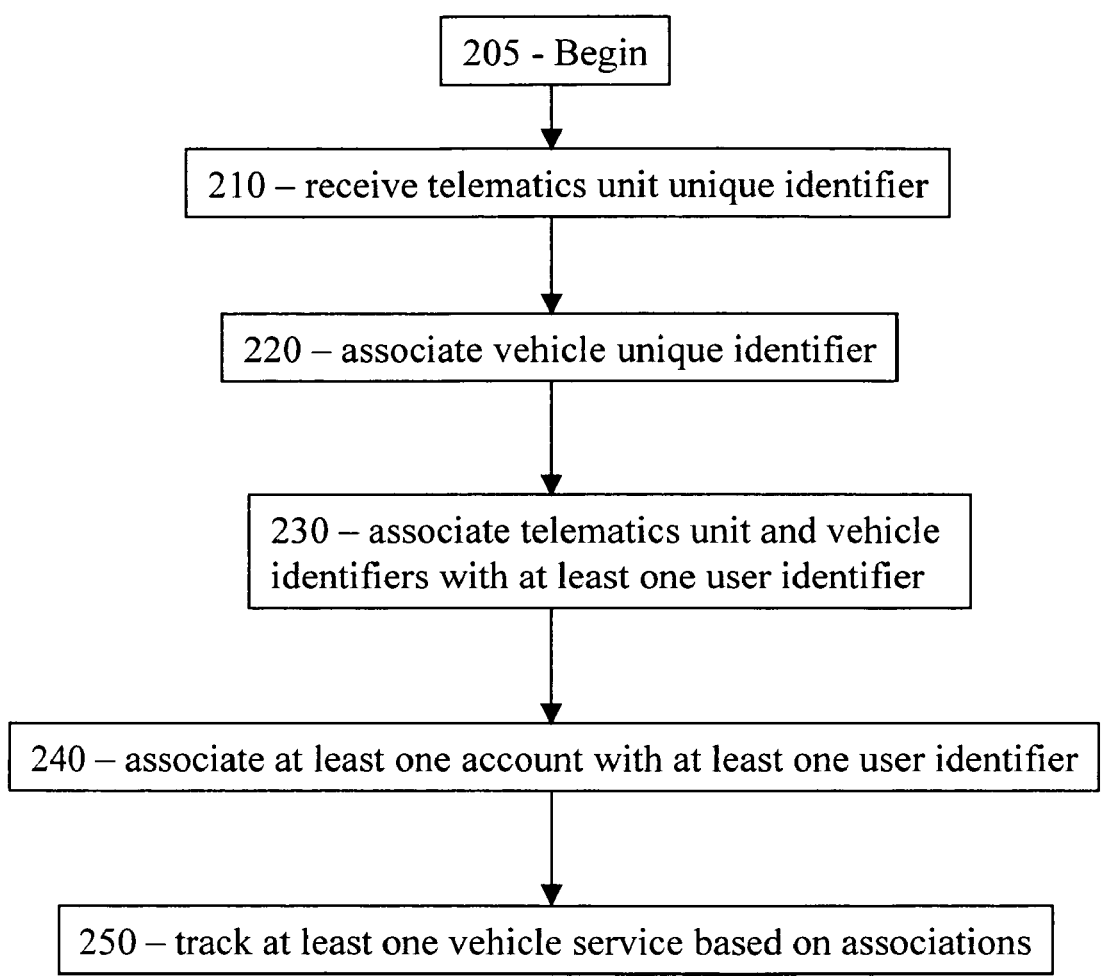
FIG. 2 illustrates one embodiment of a method for tracking vehicle services in accordance with one aspect of the invention.

FIG. 2 illustrates one embodiment of a method 200 for tracking vehicle services in accordance with one aspect of the invention. Method 200 begins at step 205.

A telematics unit unique identifier is received at step 210. In one embodiment, the telematics unit unique identifier is received in a database maintained at a location in communication with call center 170. The database can be maintained within the call center 170, or at a location in electronic communication with call center 170, such as over a wired or wireless network. In one embodiment, the network is the Internet. For example, in one embodiment, the database is maintained within databases 166. In another embodiment, the database is maintained within communication services managers 174. The database can be any appropriate data storage device and/or software, including a relational database or a data mine.

A telematics unit unique identifier is any unit of data that is unique to an individual telematics unit, and not shared by other devices. For example, the serial number of the telematics unit is the telematics unit unique identifier in one embodiment. In another example, the telematics unit unique identifier is a software serial number identifying the software executing on the telematics unit. In another embodiment, the telematics unit unique identifier is an electronic serial number.

A vehicle unique identifier is received and associated with the telematics unit unique identifier at step 220. A vehicle unique identifier is any bit of data that is unique to a particular instance of the vehicle, and not shared by other vehicle. For example, the serial number or Vehicle Identification Number ("VIN") of the vehicle is the telematics unit unique identifier in one embodiment. In another embodiment, the vehicle unique identifier is an electronic serial number. In another embodiment, the vehicle unique identifier is a serial number of a particular component of the vehicle, such as an engine, transmission, or the like. A vehicle unique identifier can be associated with multiple users, such as in the event of a vehicle sale, multiple telematics units such as in the event that a telematics unit is exchanged such as to cure a defect or update the hardware.

A user identifier is received, and associated with at least one telematics unit unique identifier and at least one vehicle unique identifier at step 230. The user identifier can be any data indicative of a person or entity that will operate the vehicle associated with the vehicle unique identifier. For example, the user can be a person's name, username, social security or other unique number, a Taxpayer Identity Number, corporate or division or department name, or the like. A user can be associated with multiple accounts, multiple telematics units and multiple vehicles so that a user can change telematics units in the event of a product or software defect, or a change in vehicle ownership, or a change in account information, such as an upgrade or downgrade in accounts.

An account identifier is received, and associated with at least one telematics unit unique identifier and at least one vehicle unique identifier and at least one user at step 240. An account identifier is data indicative of a subscription status for providing vehicle services. In one embodiment, the account identifier includes subscription information. Subscription information includes any information relevant to a subscription, such as a billing address, residential and/or business address, phone number, credit card information, credit information, debit information, start date, end date, renewal status, personal calling minutes, satellite radio subscription information, service information indicative of services covered by the account associated with the account identifier, and the like. An account can include information indicative of different vehicles or different telematics unit such that the account can be transferred between vehicles, telematics units, or users.

Vehicle services provided to a user are tracked based on the user identifier, telematics unit unique identifier, vehicle unique identifier and account identifier at step 250. Vehicle services are any service, such as door unlock, driving directions, or other vehicle management for which the telematics unit is configured, and for which the account associated with the account identifier provides.

In one embodiment, step 250 includes receiving a request for the service at a call center from at least one of the user and telematics unit. Based on the request, the call center determines an associated account. Based on the account information, the call center authorizes provision of the requested service or does not authorize provision of the requested service. For example, a particular user or telematics unit may not have a current subscription for call center services, or their subscription may not provide for the requested service. The provision of requested services is tracked in accordance with the invention.

In one embodiment, each association is tracked by associating the identifiers in a single database. In one embodiment, the single database comprises a plurality of tables, each table comprising related information.

Figure 3:
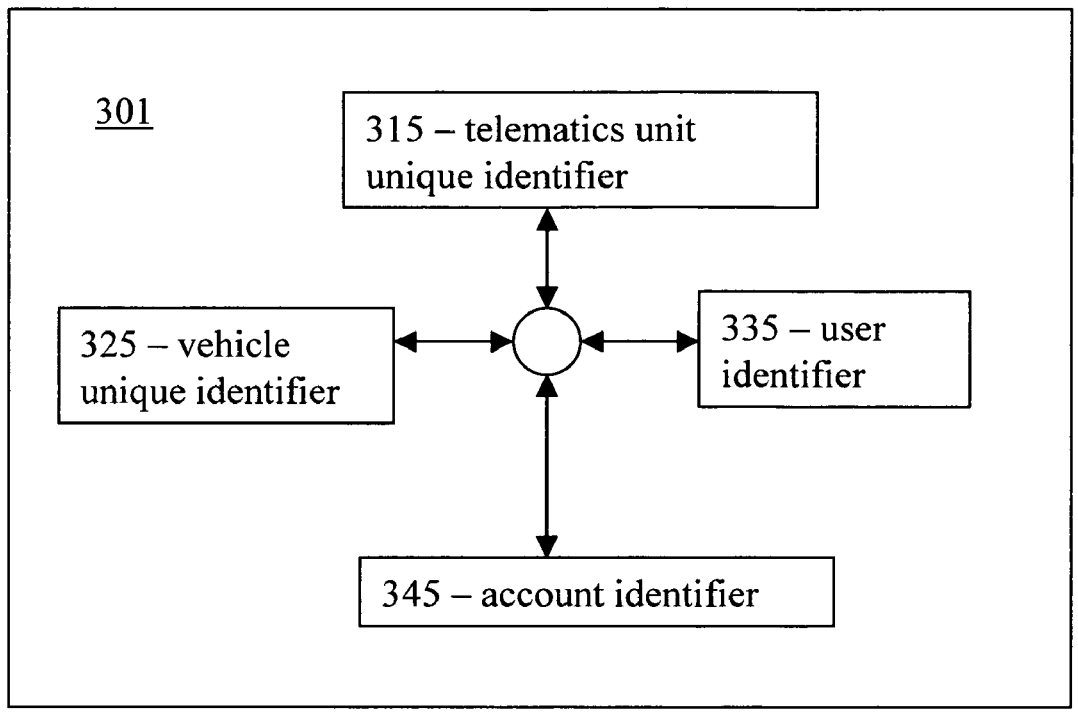
FIG. 3 illustrates another embodiment of a data architecture for tracking vehicle services in accordance with one aspect of the invention.

FIG. 3 illustrates a schematic embodiment of a database 300 in accordance with one aspect of the invention. Database 300 includes a table 301 including a telematics unit unique identifier 315, vehicle unique identifier 325, user identifier 335 and an account identifier 345, each of which is associated with the other identifiers.

The present invention may be embodied in other specific forms without departing from the spirit or essential characteristics. The described embodiments are to be considered in all respects only as illustrative and not restrictive. Those of ordinary skill in the art will readily recognize that specific time intervals or time spans other than those that are mentioned herein are contemplated, and would be able to implement such an alternate implementation without undue experimentation.

What is claimed is:

1. A method of tracking vehicle services, the method comprising:
   receiving a telematics unit unique identifier;
   associating a vehicle unique identifier with the telematics unit unique identifier;
   associating a user with at least one unique identifier of a telematics unit and a unique identifier of a vehicle;
   associating an account with at least one user identifier; and
   tracking at least one vehicle service to a user based on the associated telematics unit, vehicle, user identifier, and account.

2. The method of claim 1 wherein the associated telematics unit unique identifier, vehicle unique identifier, user identifier, and account are associated in a single database.

3. The method of claim 1 wherein the telematics unit unique identifier is the serial number of the telematics unit.

4. The method of claim 1 wherein the vehicle unique identifier is the serial number of the vehicle.

5. The method of claim 1 wherein the account comprises subscription information.

6. The method of claim 1 wherein tracking at least one vehicle service to a user based on the associated telematics unit, vehicle, user identifier, and account comprises receiving a request for the service at a call center from at least one of the user and telematics unit; determining an associated account based on the request; and authorizing provision of the service based on the associated account.

7. A computer usable medium comprising computer readable code for tracking vehicle services, the medium comprising:
   computer readable code for receiving a telematics unit unique identifier;
   computer readable code for associating a vehicle unique identifier with the telematics unit unique identifier;
   computer readable code for associating a user identifier with at least one unique identifier of a telematics unit and a unique identifier of a vehicle;
   computer readable code for associating an account with at least one user; and computer readable code for tracking at least one vehicle service to a user based on the associated telematics unit, vehicle, user identifier, and account.

8. The medium of claim 7 wherein the associated telematics unit unique identifier, vehicle unique identifier, user identifier, and account are associated in a single database.

9. The medium of claim 7 wherein the telematics unit unique identifier is the serial number of the telematics unit.

10. The medium of claim 7 wherein the vehicle unique identifier is the serial number of the vehicle.

11. The medium of claim 7 wherein the account comprises subscription information.

12. A system for tracking vehicle services, the system comprising:

means for receiving a telematics unit unique identifier;

means for associating a vehicle unique identifier with the telematics unit unique identifier;

means for associating a user identifier with at least one unique identifier of a telematics unit and a unique identifier of a vehicle;

means for associating an account with at least one user identifier; and means for tracking at least one vehicle service to a user based on the associated telematics unit, vehicle, user identifier, and account.

\* \* \* \* \*